US012140293B1

(12) United States Patent
Chiu et al.

(10) Patent No.: US 12,140,293 B1
(45) Date of Patent: Nov. 12, 2024

(54) LIGHT-EMITTING DEVICE AND COVERING STRUCTURE

(71) Applicant: Wistron NeWeb Corporation, Hsinchu (TW)

(72) Inventors: Yu-Kai Chiu, Hsinchu (TW); Chang-Yu Huang, Hsinchu (TW); Wei-Hung Liao, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 18/646,849

(22) Filed: Apr. 26, 2024

(30) Foreign Application Priority Data

Nov. 22, 2023 (TW) ................................ 112145119

(51) Int. Cl.
*F21V 15/01* (2006.01)
*F21V 23/00* (2015.01)
*F21V 31/00* (2006.01)
*F21Y 115/10* (2016.01)

(52) U.S. Cl.
CPC ............ *F21V 15/01* (2013.01); *F21V 23/005* (2013.01); *F21V 31/005* (2013.01); *F21Y 2115/10* (2016.08)

(58) Field of Classification Search
CPC ....... F21V 15/01; F21V 23/005; F21V 31/005
See application file for complete search history.

(56) References Cited

U.S. PATENT DOCUMENTS

| | | | | |
|---|---|---|---|---|
| 10,683,995 | B1 * | 6/2020 | Hashimoto | F21V 17/16 |
| 2016/0356476 | A1 * | 12/2016 | Hu | F21V 29/503 |
| 2018/0202613 | A1 * | 7/2018 | Liaw | F21V 23/005 |
| 2020/0355987 | A1 * | 11/2020 | Chen | G03B 15/05 |
| 2021/0364687 | A1 * | 11/2021 | Wang | G02B 6/4262 |
| 2024/0136476 | A1 * | 4/2024 | Kayama | H01L 33/483 |

FOREIGN PATENT DOCUMENTS

TW 201930777 A 8/2019

* cited by examiner

*Primary Examiner* — Christopher E Dunay
(74) *Attorney, Agent, or Firm* — McClure, Qualey & Rodack, LLP

(57) ABSTRACT

A light-emitting device includes a base, a shell with a through hole, a circuit board, a first covering body and a second covering body. The shell covers on the base along an installing direction to form an accommodating space. The circuit board is disposed in the accommodating space and includes a light-emitting element configured to emit a light beam to the through hole along a light-emitting direction. A separation distance is formed between the light-emitting element and the through hole. The light-emitting direction is perpendicular to the installing direction. The first covering body and the second covering body are respectively located at a first side and a second side of the circuit board. A covering space is formed by the first covering body and the second covering body and has an opening corresponding to the through hole. The light-emitting element is located in the covering space.

20 Claims, 6 Drawing Sheets

LIGHT-EMITTING DEVICE AND COVERING STRUCTURE

RELATED APPLICATIONS

This application claims priority to Taiwan Application Serial Number 112145119, filed on Nov. 22, 2023, which is herein incorporated by reference.

BACKGROUND

Technical Field

The present disclosure relates to a light-emitting device. More particularly, the present disclosure relates to a light-emitting device with a covering structure.

Description of Related Art

In order to enhance the luminous efficiency of a luminous device, the related industries have installed a mask on the luminescent device, which cover a light-emitting element to focus a light to a light-emitting hole of the luminescent device. The appearance design of a conventional light-emitting device is flat, and an installation direction of the light-emitting element, the mask and a shell is consistent with a light-emitting direction of the light-emitting element. With user's demand on appearance and use of the luminescent device, a vertical cylindrical luminescent device has been developed. However, because the installation direction is different from the light-emitting direction, the problem of light leakage from the mask is easy to occur. Further, in order to avoid collision between the shell and the light-emitting element or other electronic components during the installation of the shell, the space configuration of the circuit board has specific restrictions. Hence, the difficulty of assembly is increased, and the manufacturing cost is increased.

In view of this, a light-emitting device and a covering structure that can reduce the assembly difficulty and light leakage are the goals to be achieved by the related industries.

SUMMARY

According to one aspect of the present disclosure, a light-emitting device includes a base, a shell, a circuit board, a first covering body and a second covering body. The shell is for covering the base along an installing direction to form an accommodating space, and the shell includes a through hole. The circuit board is disposed in the accommodating space and includes a light-emitting element. The light-emitting element is used for emitting a light beam to the through hole along a light-emitting direction. The light-emitting element and the through hole are spaced apart by a separation distance, and the light-emitting direction is perpendicular to the installing direction. The first covering body is located on a first side of the circuit board, and the second covering body is located on a second side of the circuit board. A covering space is formed by the first covering body and the second covering body, and the light-emitting element is located in the covering space. The covering space includes an opening, and the opening corresponds to the through hole.

According to another aspect of the present disclosure, a covering structure includes a first covering body and a second covering body. The first covering body includes a first arc portion and two first retaining wall portions. The first arc portion extends from one end of the first covering body to another end of the first covering body at a first arc angle along a light-emitting direction of a light source, and the two first retaining wall portions are respectively integrated to two sides of the first arc portion. The second covering body is detachably connected to the first covering body and includes a second arc portion and two second retaining wall portions. The second arc portion extends from one end of the second covering body to another end of the second covering body at a second arc angle along the light-emitting direction, and the second arc portion corresponds to the first arc portion. The two second retaining wall portions are respectively integrated to two sides of the second arc portion. A covering space is formed by the first covering body and the second covering body. The covering space includes an opening, and a width of the covering space is gradually expanded from a junction of the first arc portion and the second arc portion towards the opening along the light-emitting direction.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
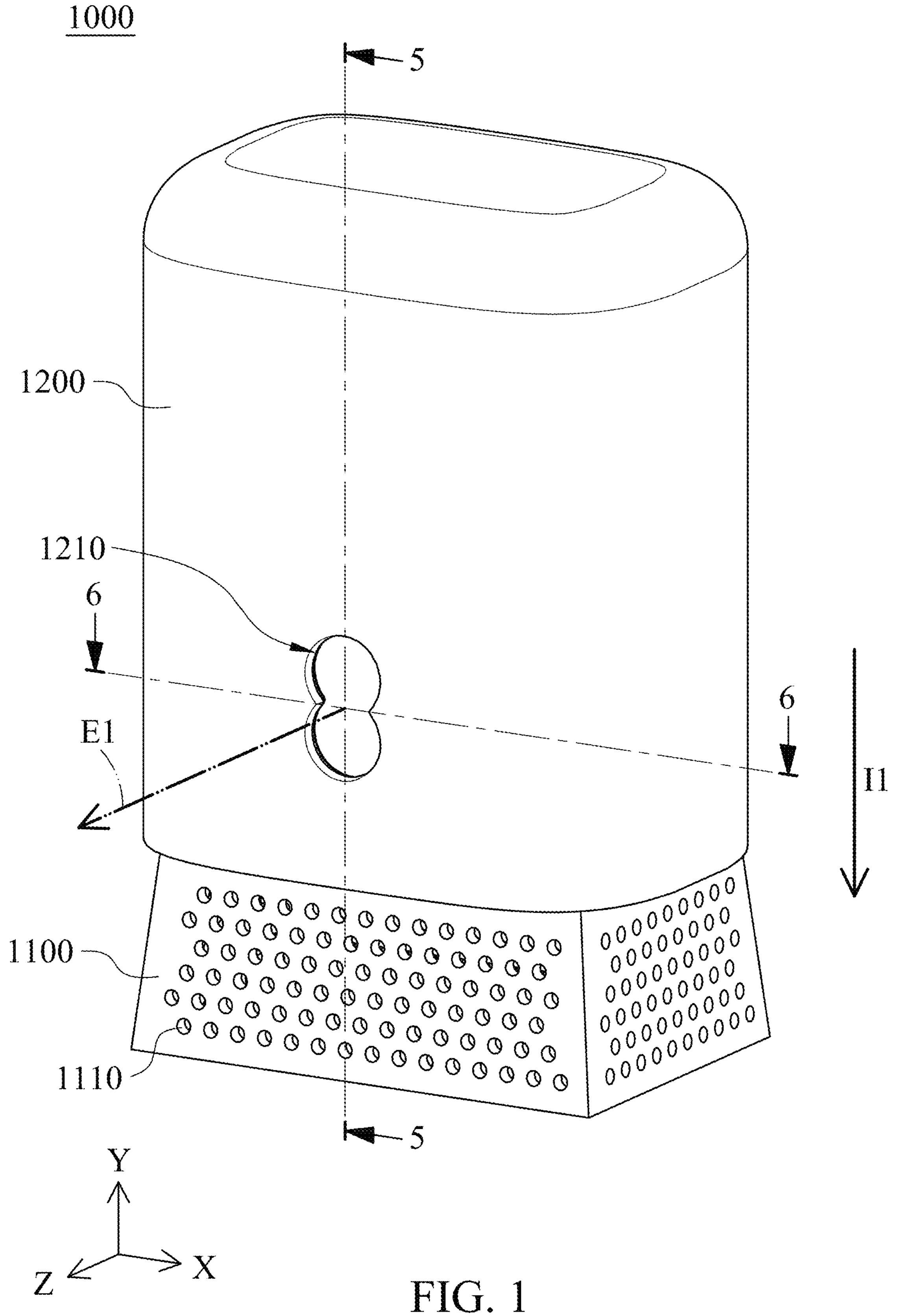
FIG. 1 is a three-dimensional schematic view of a light-emitting device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
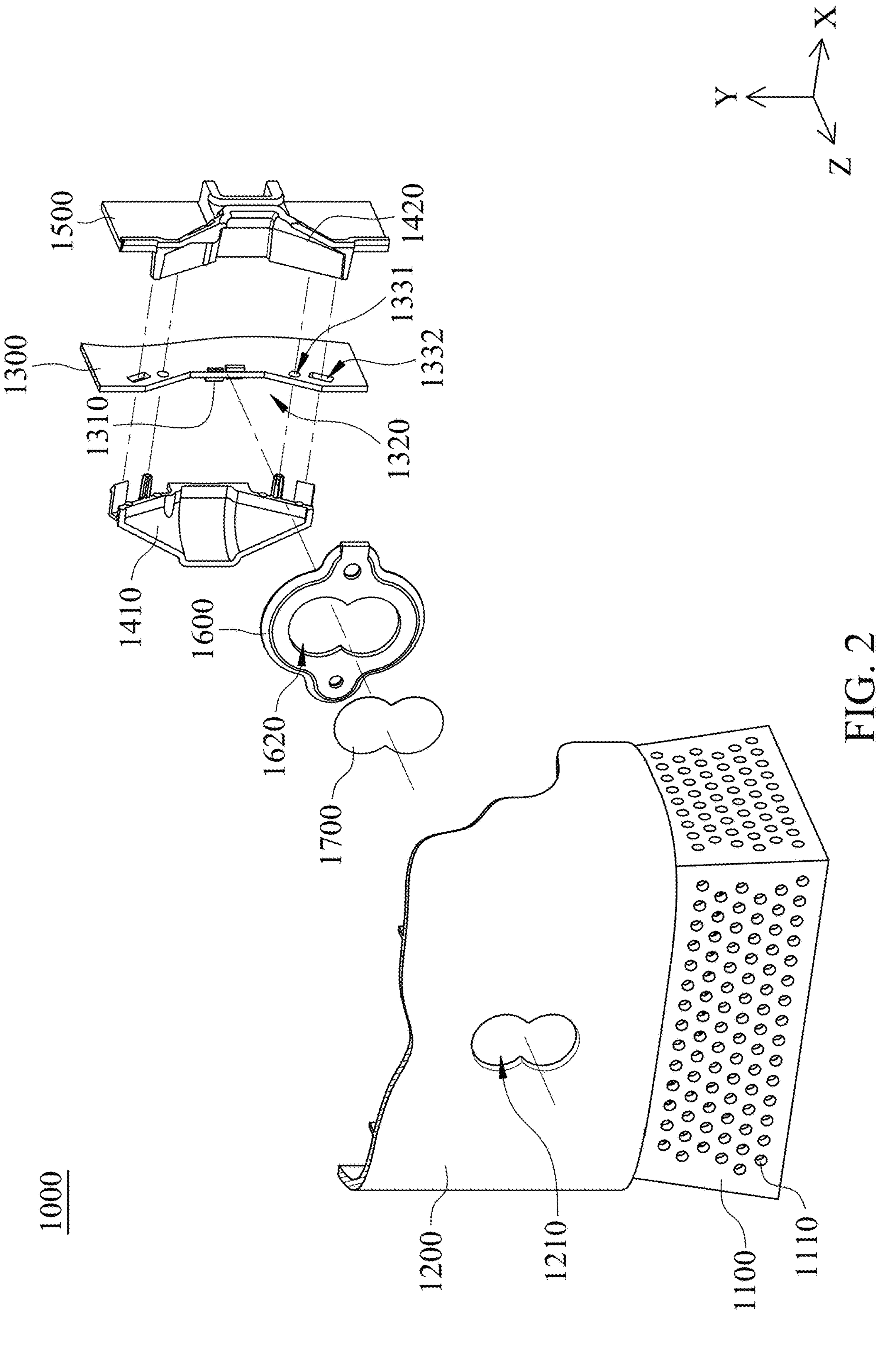
FIG. 2 is a partial exploded view of the light-emitting device according to the embodiment of FIG. 1.

Reference is made to FIG. 1 and FIG. 2. FIG. 1 is a three-dimensional schematic view of a light-emitting device 1000 according to an embodiment of the present disclosure, and FIG. 2 is a partial exploded view of the light-emitting device 1000 according to the embodiment of FIG. 1. The light-emitting device 1000 includes a base 1100, a shell 1200, a circuit board 1300, a first covering body 1410 and a second covering body 1420. The shell 1200 is covered on the base 1100 along an installing direction 11 (as shown in FIG. 1, the installing direction 11 is parallel to the Y-axis) to form an accommodating space, and the shell 1200 has a through hole 1210. The circuit board 1300 is arranged in the accommodating space and has a light-emitting element 1310. The light-emitting element 1310 is used to emit a light beam to the through hole 1210 along a light-emitting direction E1 (as shown in FIG. 1, the light-emitting direction E1 is parallel to the Z-axis), and the light-emitting element 1310 and the through hole 1210 are spaced apart by a separation distance d1 (marked in FIG. 5). The light-emitting direction E1 is perpendicular to the installing direction 11. The first covering body 1410 is located on a first side of the circuit board 1300. The second covering body 1420 is located on a second side of the circuit board 1300. A covering space (not marked) is formed by the first covering body 1410 and the second covering body 1420. The light-emitting element 1310 is located in the covering space. The covering space has an opening 1430 (marked in FIG. 3), and the opening 1430 corresponds to the through hole 1210.

When the light-emitting device 1000 is assembled, the first covering body 1410 and the second covering body 1420 are respectively arranged on the first side and the second side of the circuit board 1300, the circuit board 1300 is installed on the base 1100, and then the shell 1200 is covered on the base 1100 along the installing direction 11, so that the circuit board 1300 is located in the accommodating space, and the opening 1430 corresponds to the through hole 1210 of the shell 1200. By the covering space formed by the first covering body 1410 and the second covering body 1420, the light beam of the light-emitting element 1310 can be concentrated (focused). Therefore, the light beam from being too divergent can be avoided, and the light beam can be directed to the through hole 1210 to achieve a better luminous effect. Further, contacts between the shell 1200 and the circuit board 1300 during installation can be avoided by the separation distance d1 between the light-emitting element 1310 and the through hole 1210, and a larger light-emitting space to increase the area of the light-emitting region can be provided, so that the luminous efficiency can be enhanced. In this way, the manufacturing costs of the components can be reduced, and the design difficulty of the assembly direction being different from the light-emitting direction can be reduced, so that the problem of light leakage of the conventional light-emitting device due to the difference between the assembly direction and the light-emitting direction can be solved. Thus, the manufacturing costs and the possibility of light leakage can be reduced. The structural details of the light-emitting device 1000 are described herein.

Specifically, a shape of the shell 1200 may be a long cylindrical structure, and the base 1100 may include a plurality of heat dissipation structures 1110 for dissipating heat from the circuit board 1300. In the embodiment of FIG. 1, the heat dissipation structure 1110 is a hole, but the present disclosure is not limited thereto. The light-emitting element 1310 includes a red, green, and blue LED and a white LED, but the present disclosure is not limited thereto.

The first covering body 1410 and the second covering body 1420 may be made of an opaque material, respectively. Furthermore, the light beam emitted by the light-emitting element 1310 and penetrating the first covering body 1410 and the second covering body 1420 can be blocked by an inner surface of the first covering body 1410 and an inner surface of the second covering body 1420 made of the opaque material, so the possibility of light leakage can be avoided, and the light beam can be focused. In other embodiments, the first covering body and the second covering body may be made of a light-transmitting material, and surfaces of the first covering body and the second covering body can be processed so that the first covering body and the second covering body respectively have an opaque surface (an inner surface or an outer surface or both the inner surface and the outer surface). Therefore, the light beam emitted by the light-emitting element can be blocked, but the present disclosure is not limited thereto. Furthermore, the first covering body 1410 and the second covering body 1420 can be made of a reflective material, respectively. Further, the reflectivity of the reflective material can be greater than or equal to 60% and smaller than or equal to 100%. In other words, the inner surface of the first covering body 1410 and the inner surface of the second covering body 1420 may each have a reflectivity, and the reflectivity is between 60% and 100%. Therefore, the light beam emitted by the light-emitting element 1310 can be reflected and directed to the opening 1430 and emitted from the through hole 1210, and the brightness of the luminous light can be increased. In other embodiments, a reflective coating may be further provided, which is arranged on the inner surface of the first covering body and the inner surface of the second covering body to reflect the light beam of the light-emitting element, but the present disclosure is not limited thereto.

Figure 3:
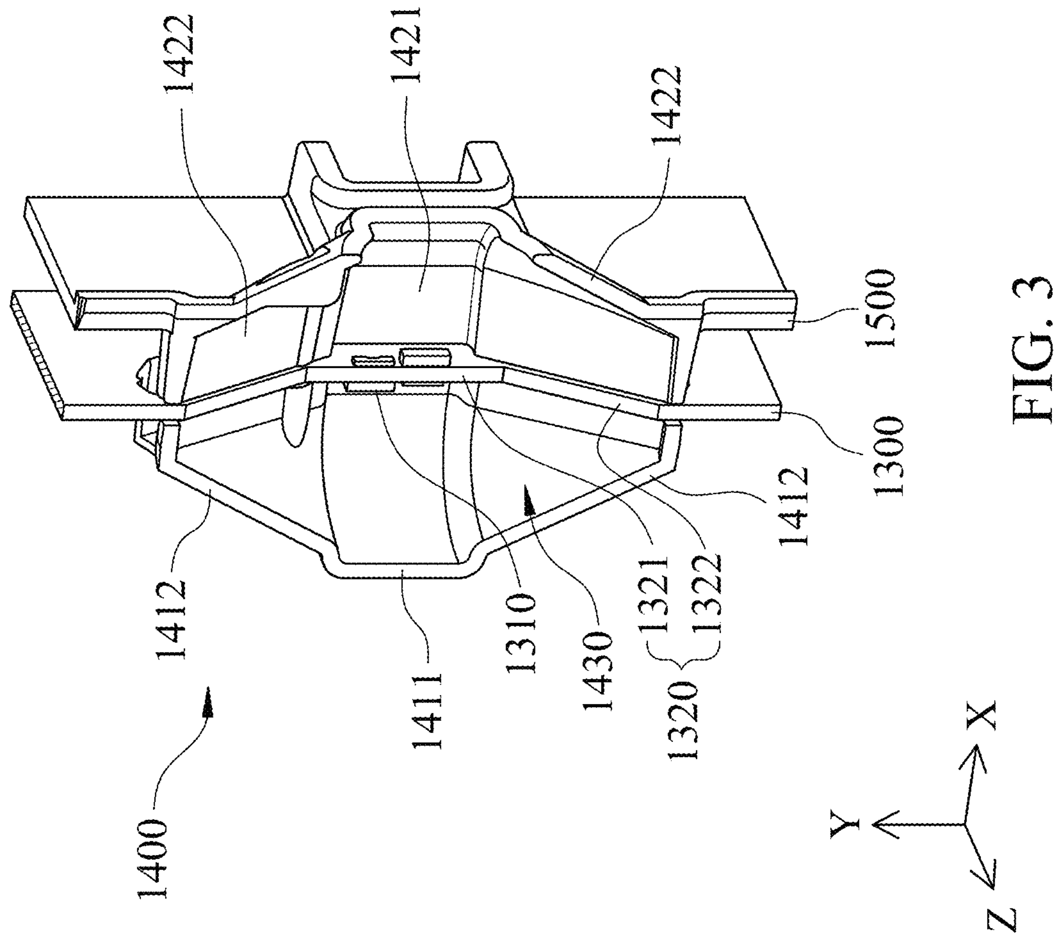
FIG. 3 is a three-dimensional schematic view of a covering structure and a circuit board according to the embodiment of FIG. 2.

Reference is made to FIG. 3. FIG. 3 is a three-dimensional schematic view of a covering structure 1400 and the circuit board 1300 according to the embodiment of FIG. 2. The second covering body 1420 is detachably connected to the first covering body 1410 to form a covering structure 1400 with a covering space.

As shown in FIG. 1 to FIG. 3, the first covering body 1410 includes a first arc portion 1411 and two first retaining wall portions 1412. The first arc portion 1411 extends from one end of the first covering body 1410 to another end of the first covering body 1410 at a first arc angle along the light-emitting direction E1 of the light source (in the embodiment of FIG. 3, the light source is the light-emitting element 1310). The two first retaining wall portions 1412 are respectively integrated to two sides of the first arc portion 1411. The second covering body 1420 includes a second arc portion 1421 and two second retaining wall portions 1422. The second arc portion 1421 extends from one end of the second covering body 1420 to another end of the second covering body 1420 at a second arc angle along the light-emitting direction E1, and the second arc portion 1421 corresponds to the first arc portion 1411. The two second retaining wall portions 1422 are respectively integrated to two sides of the second arc portion 1421. A width of the covering space is gradually expanded from a junction of the first arc portion 1411 and the second arc portion 1421 towards the opening 1430 along the light-emitting direction E1.

Specifically, a first retaining wall angle is formed between the two first retaining wall portions 1412, and a second retaining wall angle is formed between the two second retaining wall portions 1422. The first retaining wall angle is equal to the second retaining wall angle. The first retaining wall angle and the second retaining wall angle are obtuse angles, so that the overall shape of the covering structure 1400 is a concave structure, and the light beam of the light-emitting element 1310 can be reflected to the through hole 1210 along an inner surface of the covering structure 1400 to enhance the luminous brightness. In detail, a width of each of the first retaining wall portions 1412 is gradually decreased from the end connected to the first arc portion 1411 towards the end away from the first arc portion 1411, and a width of each of the second retaining wall portions 1422 is gradually decreased from the end connected to the second arc portion 1421 towards the end away from the second arc portion 1421. A maximum width of the first covering body 1410 is located at the first arc portion 1411, and a maximum width of the second covering body 1420 is located at the second arc portion 1421. A part of the covering space formed by each of the first retaining wall portions 1412 and the second retaining wall portion 1422 corresponding thereof is a semi-conical shape, and another part of the covering space formed by the first arc portion 1411 and the second arc portion 1421 is a semi-cylindrical shape, but the shape of the covering space of the present disclosure is not limited thereto.

The circuit board 1300 can further include a cut section 1320. The cut section 1320 is located on one side of the circuit board 1300 close to the through hole 1210 and includes a middle region 1321 and two beveled regions 1322, and the two beveled regions 1322 are respectively connected to two ends of the middle region 1321. A diffusion angle θ (marked in FIG. 5) is formed between the two beveled regions 1322, and the light-emitting element 1310 is arranged in the middle region 1321. Specifically, the diffusion angle θ can be greater than or equal to 80 degrees and smaller than or equal to 140 degrees, and the diffusion angle θ corresponds to the first retaining wall angle and the second retaining wall angle, so that outer sides of the two beveled regions 1322 can be aligned with the first retaining wall portion 1412 and the second retaining wall portion 1422. The middle region 1321 is located in the covering space formed by the first arc portion 1411 and the second arc portion 1421, so that the first covering body 1410 and the second covering body 1420 enclose the light-emitting element 1310.

Figure 4:
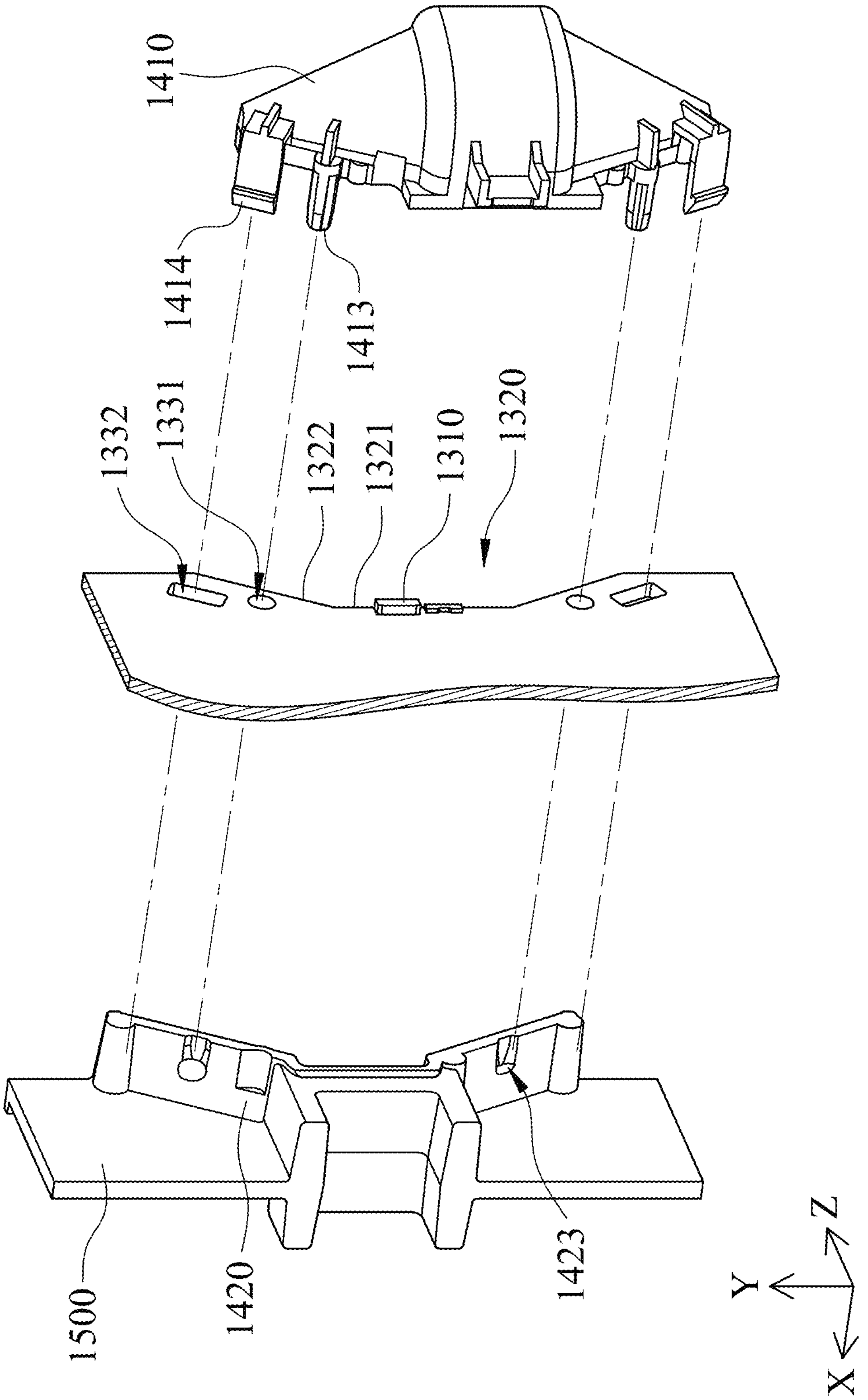
FIG. 4 is an exploded view of the covering structure and the circuit board according to the embodiment of FIG. 2 from another perspective.

Reference is made to FIG. 4. FIG. 4 is an exploded view of the covering structure 1400 and the circuit board 1300 according to the embodiment of FIG. 2 from another perspective. As shown in FIG. 2 and FIG. 4, the first covering body 1410 may include a connecting assembly (not marked), and the connecting assembly can be detachably connected to the circuit board 1300. Specifically, the connecting assembly can include two positioning posts 1413 and two connecting hooks 1414. The circuit board 1300 can further have two positioning holes 1331 and two connecting holes 1332, and the second covering body 1420 has two positioning grooves 1423. The positioning posts 1413 respectively pass through the positioning holes 1331 to limit the first covering body 1410 to the circuit board 1300, and the positioning posts 1413 respectively abut against the positioning grooves 1423, so that the first covering body 1410 is connected to the second covering body 1420 by the circuit board 1300. The connecting hooks 1414 respectively pass through the connecting holes 1332 from the first side of the circuit board 1300 and abut against the second side of the circuit board 1300. By the configuration of the connecting assembly, the first covering body 1410 can be connected to the circuit board 1300 by the connecting hooks 1414, and after the positioning posts 1413 pass through the positioning holes 1331, the second covering body 1420 is installed on the circuit board 1300 from the second side of the circuit board 1300, but the installation method of the present disclosure is not limited thereto. Thus, the covering structure 1400 can be installed on the circuit board 1300 by wedging and engagement, so that the covering structure 1400 can be removed from the circuit board 1300 for replacement. Therefore, the smoothness of assembly can be enhanced, and the covering structure 1400 can be recycled and reused. In other embodiments, the covering structure may be connected to the circuit board by adhesive or screw locking, so the stability of the connection can be enhanced, but the present disclosure is not limited thereto.

The light-emitting device 1000 can further include a frame 1500. The frame 1500 is connected to the circuit board 1300 and arranged on the base 1100, and the second covering body 1420 is integrally molded into (formed with) the frame 1500. A surface of the frame 1500 close to the circuit board 1300 may be provided with a plurality of connecting components (not shown in the figure) to connect the circuit board 1300, and after the frame 1500 is connected to the circuit board 1300, the frame 1500 and the circuit board 1300 may be installed on the base 1100 along the installing direction 11. Specifically, the frame 1500 and the second covering body 1420 are die-casting parts made of a metal material and formed by die-casting, so that a number of molds used can be reduced. Further, the heat generated by the circuit board 1300 can be conducted to a heat dissipation component of the base 1100 by the thermal conductivity of the metal material, and the heat dissipation effect can be enhanced. Another surface of the frame 1500 can be connected to other electronic boards, and the present disclosure is not limited thereto. In other embodiments, the first covering body, the frame and the second covering body may all be made of plastic material or metal material, and materials of the present disclosure is limited thereto.

Figure 5:
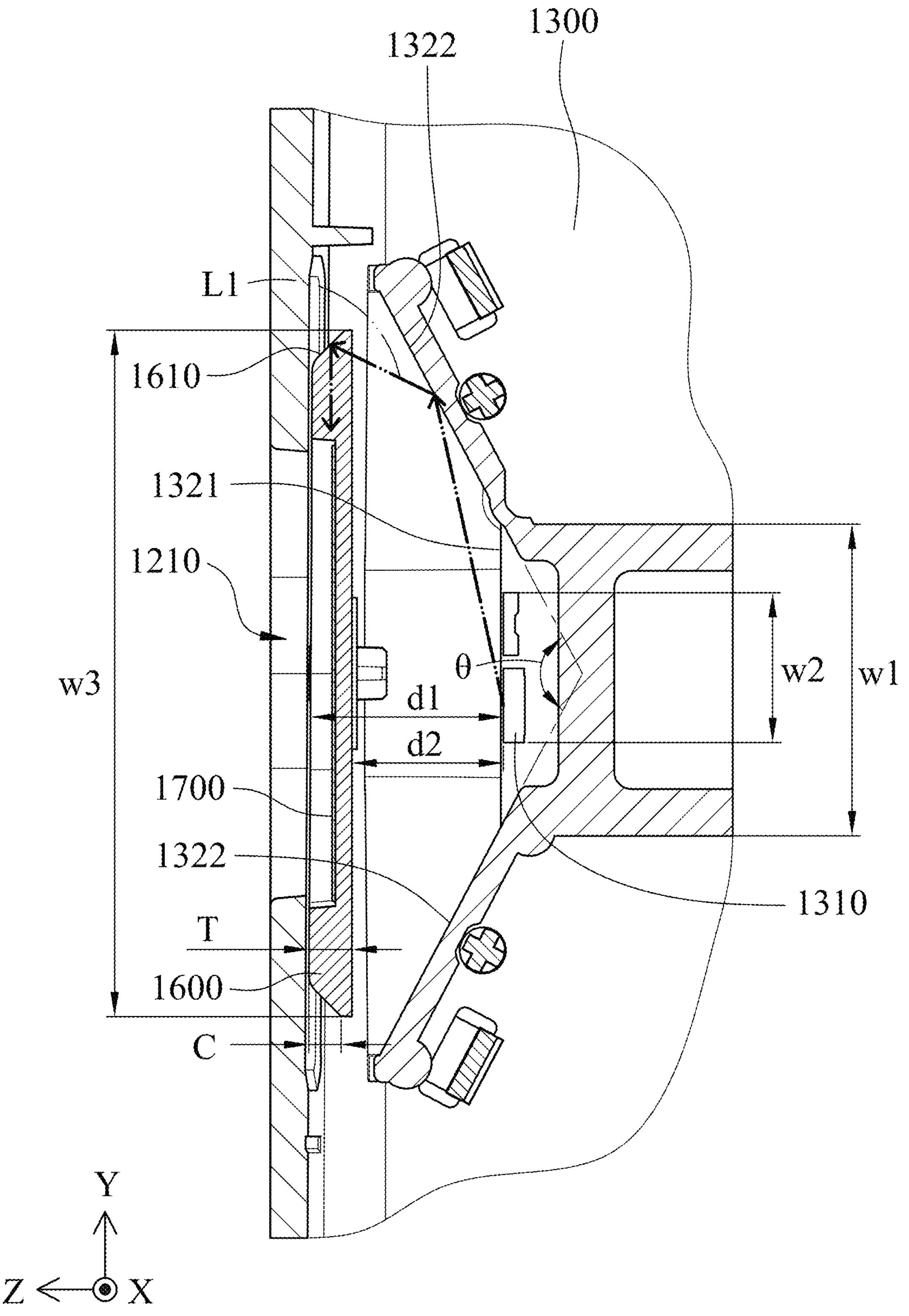
FIG. 5 is a partial cross-sectional view along line 5-5 of the light-emitting device according to the embodiment of FIG. 1.
Figure 6:
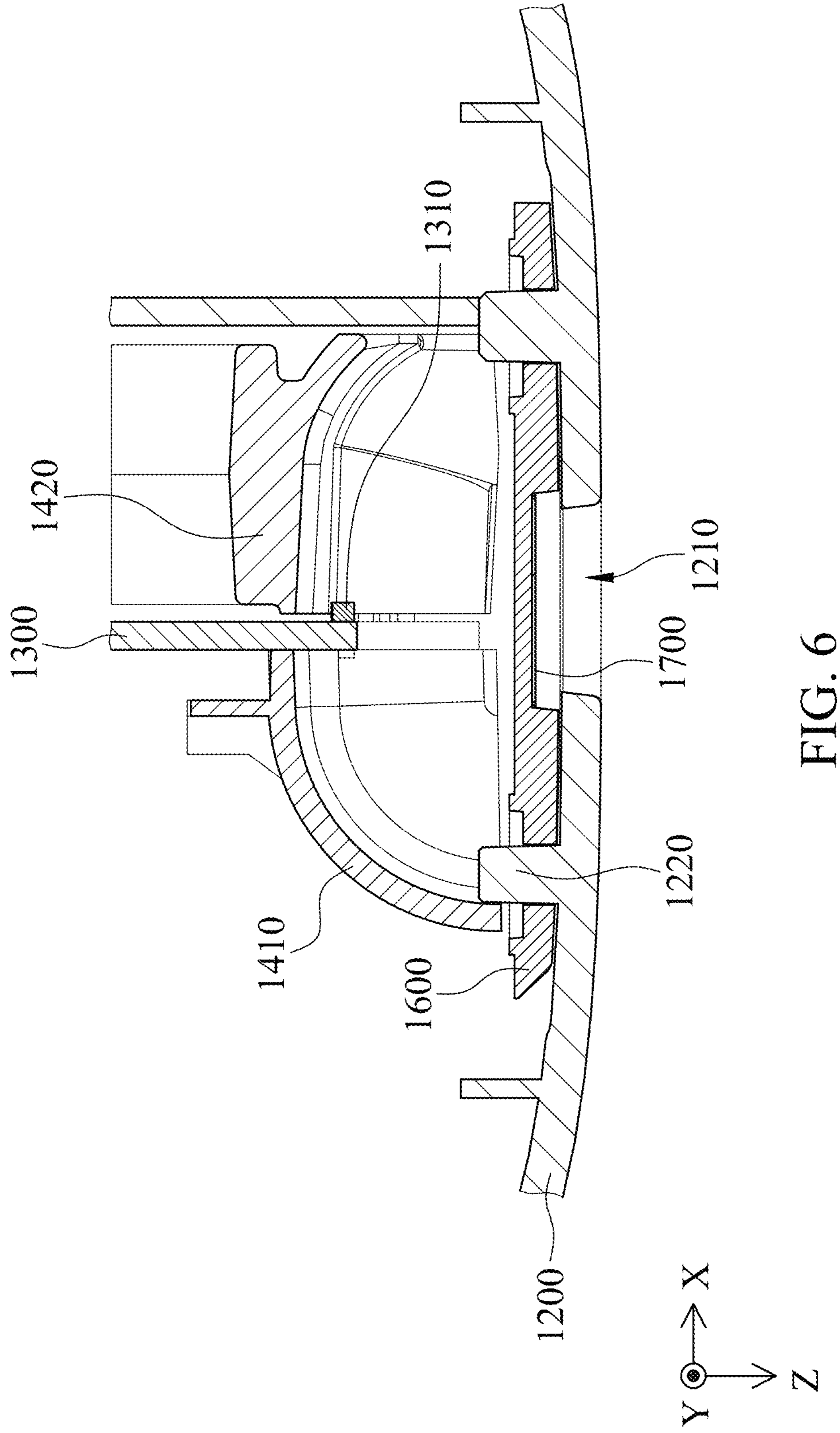
FIG. 6 is a partial cross-sectional view along line 6-6 of the light-emitting device according to the embodiment of FIG. 1.

Reference is made to FIG. 5 and FIG. 6. FIG. 5 is a partial cross-sectional view along line 5-5 of the light-emitting device 1000 according to the embodiment of FIG. 1, and FIG. 6 is a partial cross-sectional view along line 6-6 of the light-emitting device 1000 according to the embodiment of FIG. 1. As shown in FIG. 5, a length w1 of the middle region 1321 of the cut section 1320 on the circuit board 1300 can be greater than a length w2 of the light-emitting element 1310, so that the luminous brightness can be increased.

The light-emitting device 1000 may further include a light guiding element 1600. The light guiding element 1600 is arranged between the shell 1200 and the light-emitting element 1310 and covers the through hole 1210. Specifically, the light guiding element 1600 can be an injection-molded plastic element with a diffusion agent or a diffusion diaphragm to evenly diffuse the light beam, but the present disclosure is not limited thereto. Two ends of the light guiding element 1600 may be respectively provided with an oblique portion 1610, and a width of the oblique portion 1610 is gradually decreased from the light-emitting element 1310 towards the through hole 1210. By the configuration of the oblique portion 1610 of the light guiding element 1600, the light beam emitted by the light-emitting element 1310 can be reflected along a reflected light path L1. In detail, the light beam is reflected by the covering structure 1400 then reflected by the oblique portion 1610 in a direction of the through hole 1210, and the light beam is directed to an outer side of the through hole 1210, so that the luminous effect can be enhanced. Furthermore, the light guiding element 1600 has a light guiding thickness T along the light-emitting direction E1, the oblique portion 1610 has an oblique thickness C along the light-emitting direction E1, and a ratio C/T of the oblique thickness C to the light guiding thickness T is greater than or equal to 0.4 and smaller than 1. Therefore, the effect of light guidance can be further enhanced.

As shown in FIG. 5, there is a light guiding distance d2 between the light-emitting element 1310 and the light guiding element 1600, the light guiding element 1600 has a light guiding width w3, and a ratio w3/d2 of the light guiding width w3 to the light guiding distance d2 can be greater than or equal to 1.65 and smaller than or equal to 5.5. In this way, the effect of light directing to the light guiding element 1600 can be further enhanced, and the effect of the light guiding element 1600 evenly diffusing the light beam can be enhanced.

As shown in FIG. 2, FIG. 5 and FIG. 6, a center of the light guiding element 1600 can have an accommodation slot 1620. The light-emitting device 1000 can further include a light blocking element 1700. The light blocking element 1700 is arranged on the accommodation slot 1620 of the light guiding element 1600, and shapes of the accommodation slot 1620 and the light blocking element 1700 correspond to a shape of the through hole 1210. The maximum length of the light blocking element 1700 is smaller than a maximum length of the through hole 1210. By the arrangement that the light blocking element 1700 blocks the light beam directly emitted from the light-emitting element 1310 to the through hole 1210, and together with the light guiding element 1600, the light beam reflected by the covering structure 1400 is emitted from the through hole 1210, and the effect of soft light can be further achieved.

As shown in FIG. 6, the shell 1200 can further include a fixing portion 1220, which protrudes from an inner surface of the shell 1200 towards the covering structure 1400. The fixing portion 1220 passes through a restricting hole (not marked) of the light guiding element 1600, so that the light guiding element 1600 can be fixed on the shell 1200. In other embodiments, the light guiding element may be heated to a molten state, arranged on the inner surface of the shell in the form of hot melt crimping, and fixed on the shell after cooling, but the present disclosure is not limited thereto.

In other embodiments, the light-emitting device may further include a sealing element (not shown in the figure). The sealing element is connected to the first covering body, the second covering body and the light guiding element, so that the sealing element and the light guide element cover the opening. Specifically, the sealing element may be a foam piece glued to outer sides of the first covering body, the second covering body and the light guiding element to seal the opening, so that the leakage of light from the covering space can be avoided, but the present disclosure is not limited thereto.

In summary, the light-emitting device and the covering structure provided in the present disclosure have the following advantages. First, the problem of light leakage can be avoided by the covering space formed by the first covering body and the second covering body. Second, by the configuration of the light guiding element, the light beam can be evenly diffused to achieve the effect of soft light. Third, by arrangement of the connecting assembly, the first covering body and the second covering body can be connected to the circuit board.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light-emitting device comprising:
- a base;
- a shell for covering the base along an installing direction to form an accommodating space, and the shell comprising a through hole;
- a circuit board disposed in the accommodating space and comprising a light-emitting element, wherein the light-emitting element is used for emitting a light beam to the through hole along a light-emitting direction, the light-emitting element and the through hole are spaced apart by a separation distance, and the light-emitting direction is perpendicular to the installing direction;
- a first covering body located on a first side of the circuit board; and
- a second covering body located on a second side of the circuit board;
- wherein a covering space is formed by the first covering body and the second covering body, the light-emitting element is located in the covering space, the covering space comprises an opening, and the opening corresponds to the through hole.

2. The light-emitting device of claim 1, wherein the first covering body and the second covering body respectively have an opaque surface.

3. The light-emitting device of claim 1, wherein the first covering body and the second covering body are made of a reflective material.

4. The light-emitting device of claim 3, wherein a reflectivity of the reflective material is greater than or equal to 60% and smaller than or equal to 100%.

5. The light-emitting device of claim 1, wherein the circuit board further comprises a cut section, the cut section is located on one side of the circuit board close to the through hole and comprises a middle region and two beveled regions, the two beveled regions are respectively connected to two ends of the middle region, a diffusion angle is formed between the two beveled regions, and the light-emitting element is disposed in the middle region.

6. The light-emitting device of claim 5, wherein a length of the middle region is greater than a length of the light-emitting element.

7. The light-emitting device of claim 5, wherein the diffusion angle is greater than or equal to 80 degrees and smaller than or equal to 140 degrees.

8. The light-emitting device of claim 1, further comprising:
- a light guiding element disposed between the shell and the light-emitting element and covering the through hole.

9. The light-emitting device of claim 8, wherein there is a light guiding distance between the light-emitting element and the light guiding element, the light guiding element has a light guiding width, and a ratio of the light guiding width to the light guiding distance is greater than or equal to 1.65 and smaller than or equal to 5.5.

10. The light-emitting device of claim 8, wherein two ends of the light guiding element are respectively provided with an oblique portion, and a width of the oblique portion is gradually decreased from the light-emitting element towards the through hole.

11. The light-emitting device of claim 10, wherein the light guiding element has a light guiding thickness along the light-emitting direction, the oblique portion has an oblique thickness along the light-emitting direction, and a ratio of the oblique thickness to the light guiding thickness is greater than or equal to 0.4 and smaller than 1.

12. The light-emitting device of claim 8, further comprising:

a sealing element connected to the first covering body, the second covering body and the light guiding element, wherein the sealing element and the light guiding element are configured to cover the opening.

13. The light-emitting device of claim 8, further comprising:

a light blocking element disposed on the light guiding element and having a shape corresponding to a shape of the through hole, wherein a maximum length of the light blocking element is smaller than a maximum length of the through hole.

14. The light-emitting device of claim 1, wherein the first covering body comprises a connecting assembly that is detachably connected to the circuit board.

15. The light-emitting device of claim 1, further comprising:

a frame connected to the circuit board and disposed on the base, wherein the second covering body is integrally formed with the frame.

16. A covering structure comprising:

a first covering body, comprising:

a first arc portion extending from one end of the first covering body to another end of the first covering body at a first arc angle along a light-emitting direction of a light source; and two first retaining wall portions respectively integrated to two sides of the first arc portion; and a second covering body detachably connected to the first covering body and comprising:

a second arc portion extending from one end of the second covering body to another end of the second covering body at a second arc angle along the light-emitting direction, wherein the second arc portion corresponds to the first arc portion; and two second retaining wall portions respectively integrated to two sides of the second arc portion;

wherein a covering space is formed by the first covering body and the second covering body, the covering space comprises an opening, and a width of the covering space is gradually expanded from a junction of the first arc portion and the second arc portion towards the opening along the light-emitting direction.

17. The covering structure of claim 16, wherein a first retaining wall angle is formed between the two first retaining wall portions, a second retaining wall angle is formed between the two second retaining wall portions, and the first retaining wall angle is equal to the second retaining wall angle.

18. The covering structure of claim 16, wherein the first covering body is connected to the second covering body by a circuit board.

19. The covering structure of claim 16, wherein the first covering body and the second covering body enclose a light-emitting element.

20. The covering structure of claim 16, wherein an inner surface of the first covering body and an inner surface of the second covering body respectively have a reflectivity, and the reflectivity is greater than or equal to 60% and smaller than or equal to 100%.

* * * * *